(12) United States Patent
Weder et al.

(10) Patent No.: US 6,666,937 B2
(45) Date of Patent: Dec. 23, 2003

(54) METHOD AND APPARATUS FOR LABELING AND STACKING FLOWER POT COVERS

(75) Inventors: Donald E. Weder, Highland, IL (US); Frank Craig, Valley Park, MO (US)

(73) Assignee: Southpac Trust International, Inc.

( * ) Notice: Subject to any disclaimer, the term of this patent is extended or adjusted under 35 U.S.C. 154(b) by 0 days.

(21) Appl. No.: 10/260,778

(22) Filed: Sep. 27, 2002

(65) Prior Publication Data

US 2003/0066601 A1 Apr. 10, 2003

Related U.S. Application Data

(60) Provisional application No. 60/325,857, filed on Sep. 28, 2001.

(51) Int. Cl.[7] .............................................. B65B 57/02
(52) U.S. Cl. ...................... 156/64; 156/297; 156/351; 156/362; 156/556; 156/566; 53/447; 53/53; 53/505; 53/506; 53/70
(58) Field of Search ................................. 156/362, 351, 156/360, 363, 183, 64, 297, 566, 556; 47/65.5, 41.01; 53/447, 443, 445, 446, 53, 505, 506, 76, 221, 222, 223

(56) References Cited

U.S. PATENT DOCUMENTS

| 3,759,303 | A |  | 9/1973 | Henrichs |  |
|---|---|---|---|---|---|
| 3,851,747 | A |  | 12/1974 | Van Der Roer |  |
| 3,938,675 | A |  | 2/1976 | Rees |  |
| 5,106,449 | A | * | 4/1992 | Fazzina et al. | 156/510 |
| 5,379,569 | A | * | 1/1995 | Mueller | 53/397 |
| 5,450,707 | A |  | 9/1995 | Weder |  |
| 5,481,850 | A |  | 1/1996 | Weder |  |
| 5,609,009 | A |  | 3/1997 | Weder |  |
| 5,852,914 | A | * | 12/1998 | Mueller | 53/397 |

FOREIGN PATENT DOCUMENTS

| DE | 198 49 563 | 5/2000 |
|---|---|---|
| DE | 198 27 139 | 12/2000 |
| WO | WO 00/15502 | 3/2000 |

* cited by examiner

Primary Examiner—Richard Crispino
Assistant Examiner—George R. Koch, III
(74) Attorney, Agent, or Firm—Dunlap, Codding & Rogers, P.C.

(57) ABSTRACT

A method and apparatus for automatically labeling and stacking a plurality of flower pot covers. The apparatus has a first conveyor and a second conveyor. The first conveyor has a plurality of spatially disposed support assemblies connected thereto, each of the support assemblies selectively movable between a retracted position and an extended position and the second conveyor has a plurality of spatially disposed chutes supported thereon, each of the chutes having an object receiving space formed therein adapted to receive a plurality of flower pot covers, at least a portion of the second conveyor spatially disposed above the first conveyor such that a portion of the travel path of the second conveyor overlaps a portion of the travel path of the first conveyor so that the support assemblies on the first conveyor are aligned with the chutes on the second conveyor.

10 Claims, 4 Drawing Sheets

METHOD AND APPARATUS FOR LABELING AND STACKING FLOWER POT COVERS

CROSS REFERENCE TO RELATED APPLICATIONS

This application claims priority under 35 U.S.C. §119(e) of the provisional U.S. Serial No. 60/325,857, filed Sep. 28, 2001, entitled "MACHINE FOR LABELING AND STACKING OBJECTS", the contents of which are hereby expressly incorporated in their entirety by reference.

STATEMENT REGARDING FEDERALLY SPONSORED RESEARCH AND DEVELOPMENT

Not Applicable.

BACKGROUND OF THE INVENTION

The present invention relates to a method and apparatus for labeling and stacking objects, and more particularly but not by way of limitation, to a method and apparatus for automatically labeling flower pot covers and stacking labeled flower pot covers.

SUMMARY OF THE INVENTION

The present invention resides in a method and apparatus for automatically labeling and stacking objects, such as flower pot covers wherein the flower pot covers have an outer surface, an open upper end and a retaining space openly communicating with the open upper end. Broadly, the apparatus provides continuous conveyor motion between a first conveyor having a plurality of spatially disposed support assemblies and a second conveyor having a plurality of spatially disposed chutes. Movement of the first and second conveyors along their respective travel paths is synchronized and the second conveyor is positioned so that a portion of the travel path of the second conveyor overlaps the travel path of the first conveyor.

Each of the support assemblies is selectively moveable between a retracted position and an extended position; and each of the chutes is provided with an open lower end and an object receiving space. Thus, when each of the plurality of support assemblies having the flower pot covers supported thereon is selectively aligned with the open lower end of one of the plurality of chutes, the support assembly is moved to the extended position whereby the flower pot cover is inserted into the object receiving space of the chute via the open lower end of the chute. The support assembly is thereafter moved from the extended position to the retracted position resulting in disengagement of the flower pot cover from the support assembly so that the flower pot cover is supported within the object receiving space of the chute. Continuous operation of the machine results in a nested stack of flower pot covers in the object receiving space of each chute. Once a nested stack of flower pot covers is provided, the nested stack of flower pot covers is removed from the object receiving space of each of the chutes.

As the first conveyor travels along its travel path and prior to encountering the overlapping portion of the travel path of the second conveyor, each of the support assemblies secured to the first conveyor is sequentially moved through a first detection station for determining the presence of the flower pot cover on the support assembly, a second detection station for determining the location of the support assembly having the flower pot cover thereon and a labeling station. When it is determined that the flower pot cover is positioned on the support assembly and the support assembly has reached a predetermined location, a label is automatically applied to the outer surface of the flower pot cover prior to being aligned with one of the chutes supported on the second conveyor.

DETAILED DESCRIPTION OF THE INVENTION

Figure 1:
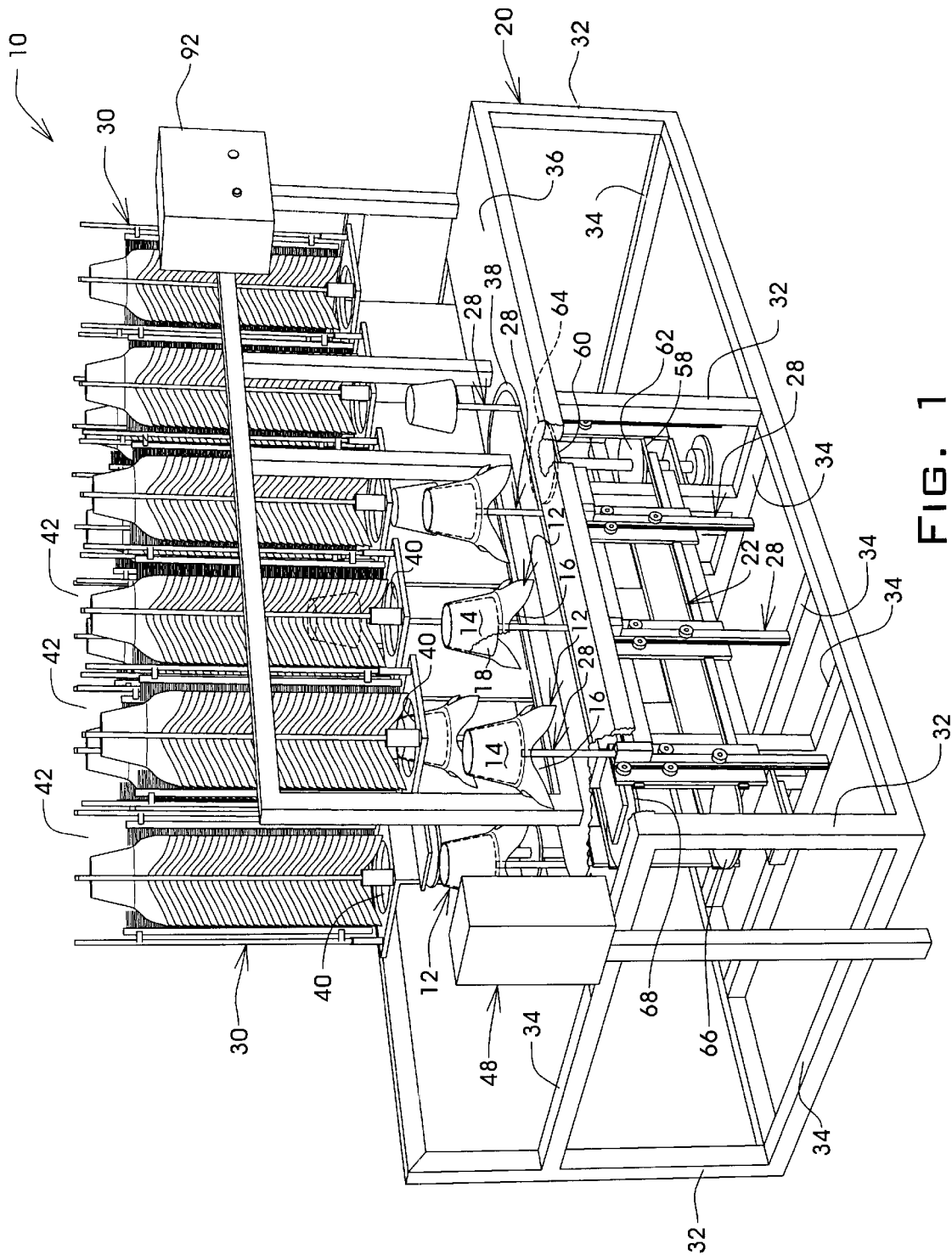
FIG. 1 is a partially cutaway, perspective frontal view of an apparatus for labeling and stacking flower pot covers constructed in accordance with the present invention.
Figure 2:
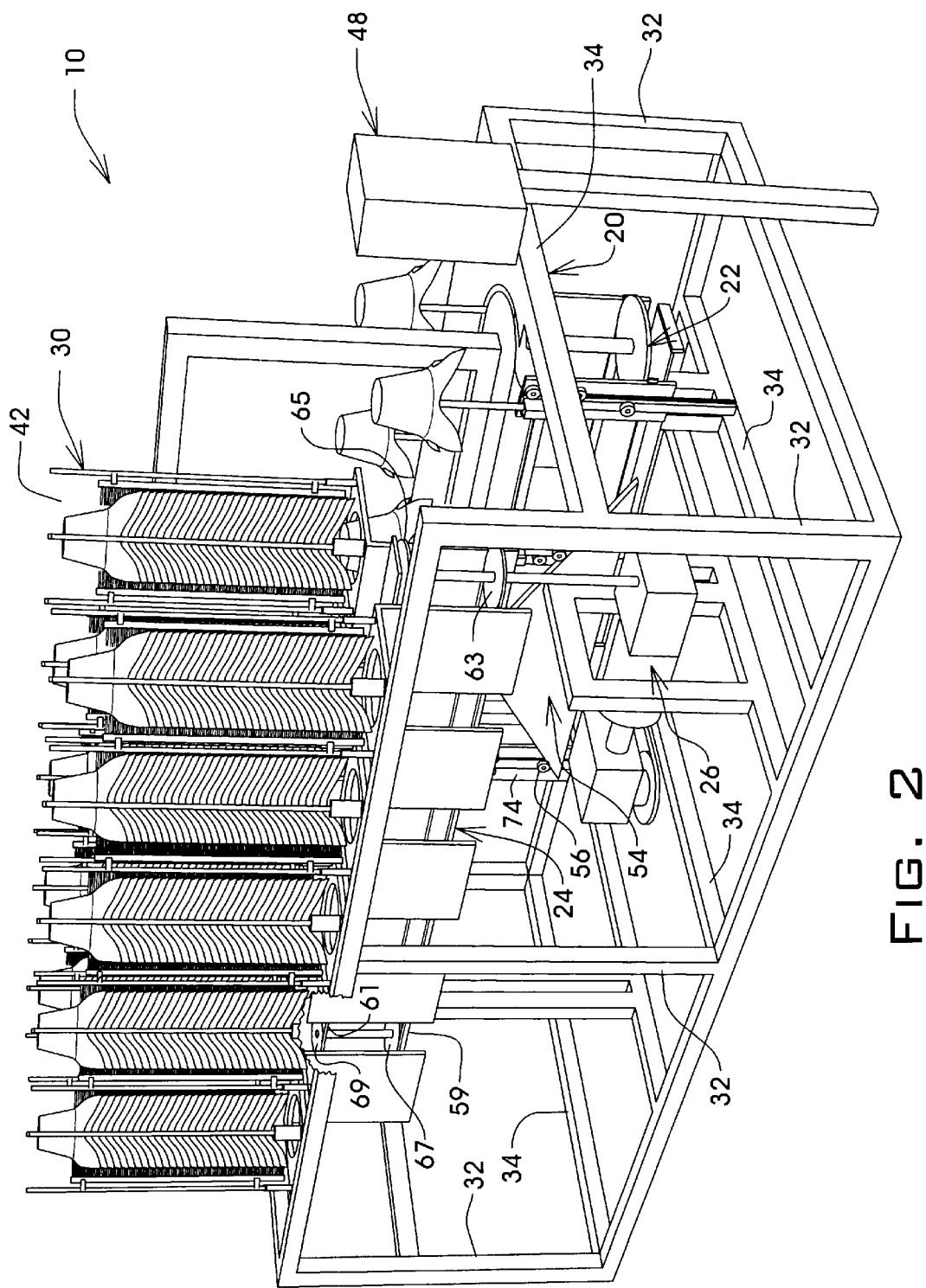
FIG. 2 is a partially cutaway, perspective rear view of the apparatus for labeling and stacking flower pot covers of FIG. 1.

Referring now to the drawings, and more particularly to FIGS. 1 and 2, shown therein is an apparatus 10 for labeling and stacking objects, such as flower pot covers 12. Each of the flower pot covers 12 has an outer surface 14, an open upper end 16 and a retaining space 18 openly communicating with the open upper end 16. The retaining space 18 of the flower pot covers 12 permits a plurality of the flower pot covers 12 to be stacked to form a nested stack of flower pot covers 12 as will be described in more detail hereinafter. Any flower pot cover having the characteristics of the flower pot covers 12 can be employed in the practice of the present invention. An example of such a flower pot cover is disclosed in U.S. Pat. No. 4,773,182, issued to Weder et al., the entire content of which is hereby expressly incorporated herein by reference.

The flower pot cover 12 is constructed from a sheet of material selected from the group consisting of paper, metal foil, cloth (natural or synthetic), denim, burlap, polymeric film and laminations or combinations thereof.

Figure 3:
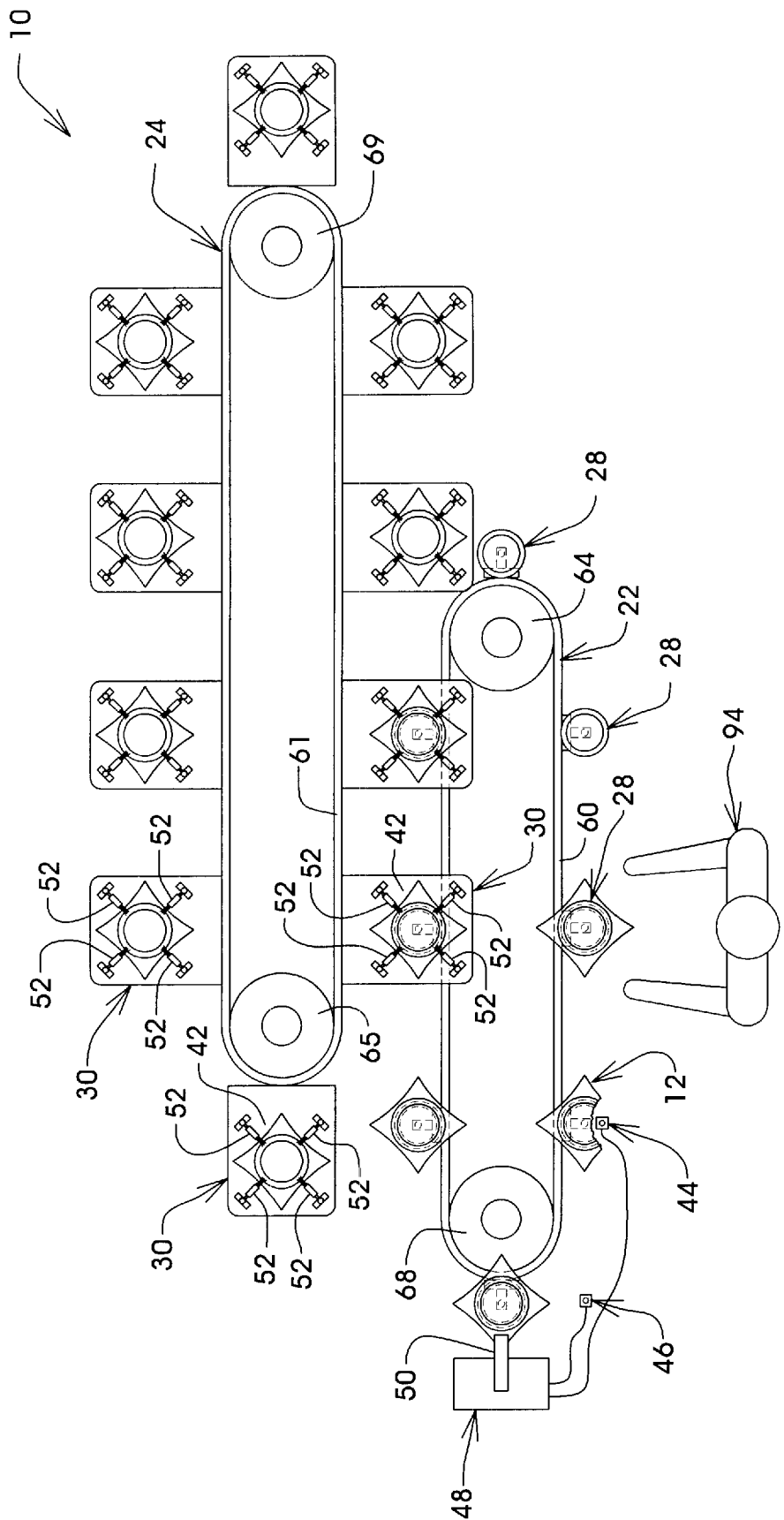
FIG. 3 is a schematic top plan view depicting a first and second conveyor of the apparatus for labeling and stacking flower pot covers and movement of same along their respective travel paths.

The apparatus 10 has a frame 20, a first or loading conveyor 22, a second conveyor 24 and a drive assembly 26 for providing continuous conveyor motion between the first conveyor 22 and the second conveyor 24 when the drive assembly 26 is activated. The first conveyor 22 is supported by the frame 20 and operably connected to the drive assembly 26; and the second conveyor 24 is supported by the frame 20 and operably connected to the drive assembly 26. The second conveyor is positioned on the frame 20 so that the second conveyor 24 is offset from the first conveyor 22 and a distance above the first conveyor 22 (FIGS. 1–3). That is, the first and second conveyors 22 and 24 are positioned such that a portion of the travel path of the second conveyor 24 overlays, in a spatial relationship, a portion of the travel path of the first conveyor 22.

The first conveyor 22 has a plurality of spatially disposed support assemblies 28 connected thereto (FIG. 1); and the second conveyor 24 has a plurality of spatially disposed chutes 30 connected thereto. Movement of the first and second conveyors 22 and 24 along their respective travel paths is synchronized such that the support assemblies 28 of the first conveyor 22 are selectively alignable with the chutes 30 of the second conveyor 24 for stacking labeled flower pot covers.

The first conveyor 22 is shown as constructed of two spatially disposed endless chains 58 and 60 disposed about a pair of drive sprockets 62 and 64, and a pair of driven sprockets 66 and 68 (See FIG. 1). The drive sprockets 62 and 64 are rigidly connected to the drive assembly 26, such as an electric motor. However, it should be understood that the first conveyor 22 having the support assemblies 28 connected thereto can be constructed of any device or devices capable of moving the support assemblies 28 as discussed herein. For example, the first conveyor 22 could be driven by a hydraulic device or a mechanical linkage. Similarly, the second conveyor 24 is shown as constructed of two spatially disposed endless chains 59 and 61 disposed about a pair of drive sprockets 63 and 65, and a pair of driven sprockets 67 and 69 (See FIG. 2). The drive sprockets 63 and 65 are rigidly connected to the drive assembly 26, such as an electric motor. However, it should be understood that the second conveyor 24 having the chutes 30 connected thereto can be constructed of any device or devices capable of moving the chutes 30 as discussed herein. For example, the second conveyor 24 could be driven by a hydraulic device or a mechanical linkage.

The frame 20 has a plurality of legs 32 and cross support members 34 which cooperate to define a housing for the first conveyor 22, the second conveyor 24 and the drive assembly 26. The frame 20 is further provided with a cover plate 36 having a slot 38 provided therein, the cover plate 36 being disposed along at least the portion of the frame 20 defining a loading station, i.e., the position wherein flower pot covers 12 are manually positioned on the support assemblies 28 of the first conveyor 24. The slot 38 is aligned with the first conveyor 22 such that a portion of the support assemblies 28 extend upwardly thru the slot 38 and travels along the slot 38 substantially as shown in FIG. 1.

Each of the support assemblies 28 is selectively moveable between a retracted position and an extended position as will be more fully described hereinafter. Further, each of the chutes 30 is provided with an open lower end 40 and an object receiving space 42 such that when each of the plurality of support assemblies 28 having the flower pot covers 12 supported thereon is selectively aligned with the open lower end 40 of one of the plurality of chutes 30, the support assembly 28 is moved to the extended position whereby the flower pot covers 12 is inserted through the open lower end 40 of the aligned chutes 30 and deposited in the object receiving space 42 of the chutes 30. The support assembly 28 is thereafter moved from the extended position to the retracted position resulting in disengagement of the flower pot covers 12 from the support assembly 28 whereby the flower pot cover 12 is supported within the object receiving space 42 of the chutes 30. The continuous operation of the machine 10 results in a nested stack of flower pot covers 12 in the object receiving space 42 of each chute 30. Once a nested stack of flower pot covers 12 is provided in the object receiving space 42 of the chutes 30, the nested stack of flower pot covers 12 are removed from the object receiving space 42 of each of the chutes 30.

As more clearly shown in FIG. 3, as the first conveyor 22 travels along its travel path and prior to encountering the overlapping portion of the travel path of the second conveyor 24, the first conveyor 22 is sequentially moved through a first detection station and a second detection station. As the first conveyor 22 passes through the first detection station, an object sensor 44 determines whether the flower pot cover 12 is positioned on the approaching support assembly 28. When the object sensor 44 detects the presence of the flower pot cover 12 on the approaching support assembly 28, the object sensor 44 enables an object support sensor 46. When the object support sensor 46 detects the presence of the approaching support assembly 28, a signal is output to a labeling device 48 having a label ejection head 50 supporting at least one label (not shown) whereby the labeling device 48 is activated and a label is automatically applied to the outer surface 14 of the flowerpot cover 12. The interconnection of the object sensor 44, the object support sensor 46 and the labeling device 48 prevents undesired activation of the labeling device 48 when the support assembly 28 traveling past the labeling device 48 does not have a flower pot cover 12 supported thereon. That is, the object support sensor 46 (which enables the labeling device 48) is only enabled by the object sensor 44 when the object sensor 44 detects the presence of the flower pot cover 12 on the approaching object support assembly 28.

Any device capable as functioning the object sensor 44 and the object support sensor 46 can be employed in the practice of the present invention. That is, the object sensor 44 and the object support sensor 46 can be sensors which output and/or receive a medium, such as light, ultrasonic waves, gas, electrical charge and the like. For example, the object sensor 44 and object support sensor 46 can be electric eyes.

The labeling device 48 employed in the practice of the present invention can be a blow-type labeling device which blows a label onto the outer surface 14 of the flower pot cover 12, or any other type of labeling device capable of applying a label to the outer surface 14 of the flower pot cover 12 when the flower pot cover 12 is conveyed past the labeling device 48. A commercially available labeling device which can be used as the labeling device 48 is a Model No. 170PAX2 Labeling machine manufactured by Zebra Technologies Corporation, 333 Corporate Woods Parkway, Vernon Hills, Ill. 60061.

As previously stated, a plurality of chutes 30 are connected to the second conveyor 24. These chutes 30 are spatially disposed on the second conveyor 24 so as to be in a spatial relationship along the travel path of the second conveyor 24. Each of the chutes 30, in addition to having the lower open end 40 and the object receiving space 42, is provided with a plurality of gripping members 52 disposed within a portion of the object receiving space 42 of each of the chutes 30 for maintaining the flower pot covers 12 in a stable position when disposed therein by the support assemblies 28 of the first conveyor 22. The lower open end 40 of each of the chutes 30 (FIGS. 1 and 2) is sized for receiving one of the flower pot covers 12 and the object receiving space 42 of each of the chutes 30 is sized for receiving a plurality of the flower pot covers 12 so that a plurality of flower pot covers 12 can be stacked in a nesting configuration, one on top of the other, in the object receiving space 42 of the chutes 30. As previously stated, the plurality of gripping members 52 (four being preferred), cooperate to retain the flower pot covers 12 or a stack of the flower pot covers 12 within the object receiving space 42 of the chutes 30.

The gripping members 52 can be any type of device shaped or adapted for gripping and retaining the flower pot covers 12 or a stack of the flower pot covers 12 within the object receiving space 42 of the chutes 30, while at the same time permitting manual removal of a stack of the flower pot covers 12 from the object receiving space 42 of the chutes 30 without damage to the stacked and nested flower pot covers 12. For example, the gripping members 52 can be elongated brushes having a plurality of bristles with the bristles of the brushes engaging the flower pot cover 12 or the stack of flower pot covers 12 disposed in the object receiving space 42 of the chutes 30. While the gripping members 52 have been shown as elongated brushes having bristles, it should be understood that any type of device can be employed which would protrudes into the object receiving space 42 of the chutes 30 and which will permit passage of the flower pot cover 12 through the object receiving space 42 so that the flower pot covers 12 can be stacked or nested in the object receiving space 42 of each of the chutes 30 as herein before described. Further, the gripping members 52 are adjustably connected to each of the chutes 30 so that the size of the object receiving space 42 can be varied to accommodate different sizes of flower pot covers 12. That is, the gripping members 52 are adjustably connected to each of the chutes 30 so that the internal dimensions of the chutes 30 can be adjusted to accommodate varying sizes of flower pot covers 12. For example, the gripping members 52 can be moved away from each other for permitting larger size flower pot covers 12 to be disposed within the object receiving space 42 of the chutes 30 or moved closer together for gripping and retaining smaller sized flower pot covers 12 withing the object receiving space 42 of the chutes 30.

Figure 4:
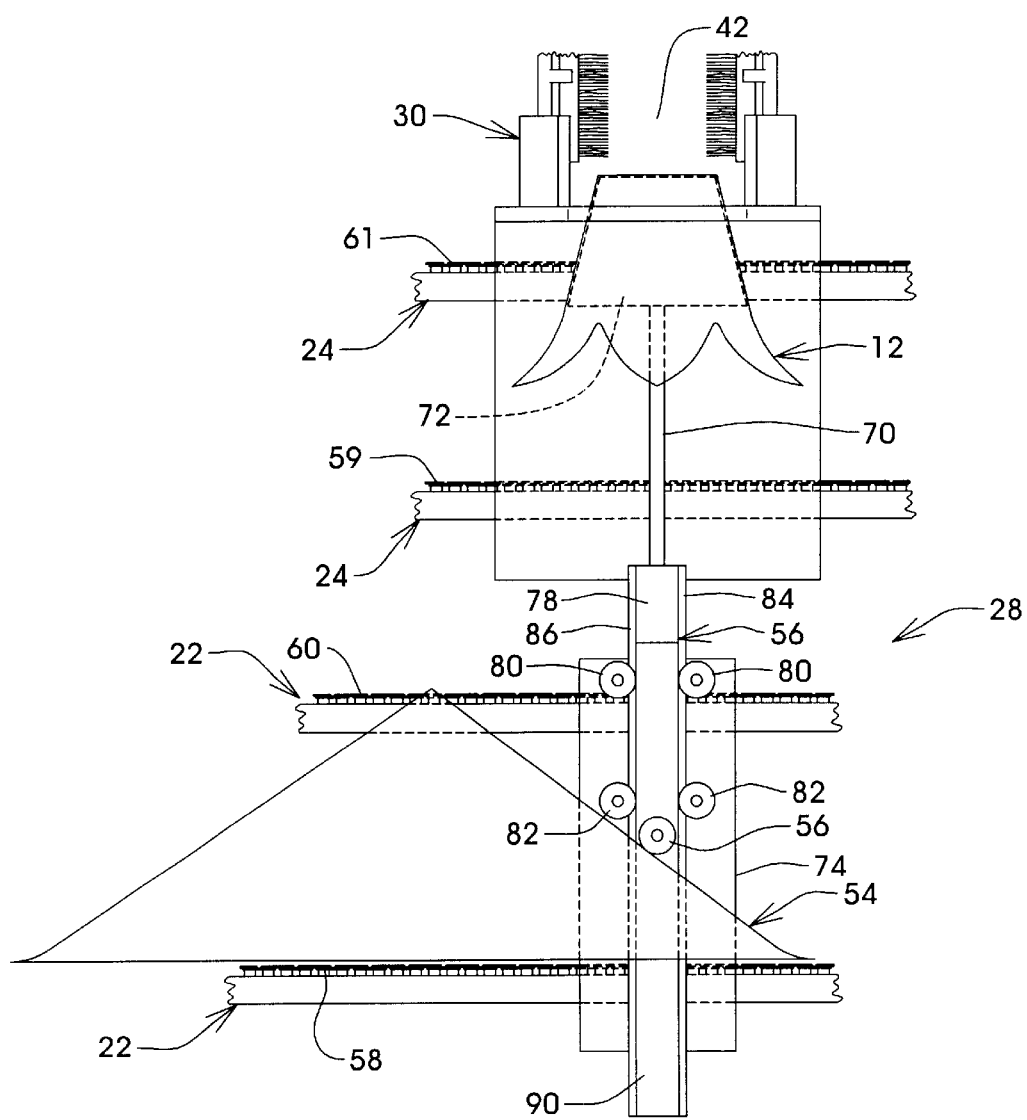
FIG. 4 is an elevational view of an object support secured to the first conveyor traveling upward on a cam for positioning the object support in an extended position so that the labeled flower pot supported on the object support can be inserted into a chute connected to the second conveyor.

Referring now to FIGS. 1 and 4, shown therein is a more detailed view of the object support assemblies 28 and the relationship of the object support assembly 28 with a cam 54 which permits the support assemblies to be selectively moved from a retracted position to an extended position for inserting the flower pot cover 12 supported thereon into the object receiving space 42 of one of the chutes 30. The cam 54 is shown as having a substantially inverted "V" configuration. However, it should be understood that the cam 54 can be provided with any shape or configuration so long as the cam 54 causes the support assemblies 28 secured to the first conveyor 22 to move in and out of the object receiving space 42 of the chutes 30 secured to the second conveyor 24 when one of the support assemblies 28 of the first conveyor 22 is aligned with the object receiving space 42 of one of the chutes 30 of the second conveyor 24.

Referring now to FIG. 4, one of the support assemblies 28 at its movement along the cam 54 to position the support assembly 28 in an extended position is shown in more detail. Each of the support assemblies 28 are substantially identical in construction. Thus, only the operation and construction of one of support assemblies 28 will be described with reference to FIG. 4. The support assembly 28 is provided with a cam follower assembly 56 which is connected to the first conveyor 22 by any suitable device, such as an "L" shaped bracket.

Connected to the cam follower assembly 56 is a support rod 70. The support rod 70 extends from the cam follower assembly 56 and supports a supporting structure 72. The supporting structure 72 is rigidly connected to the support rod 70. Likewise, the support rod 70 is rigidly connected to the cam follower assembly 56. The support rod 72 extends through the elongated slot 38 in the cover plate 36 of the frame 20 (FIG. 1).

The cam follower assembly 56 is provided with a support block 74, a cam follower 76, a mandril 78, a first set of guide rollers 80 and a second set of guide rollers 82. The support block 74 is connected to the first conveyor 22 by any suitable device, such as an "L" shaped bracket. The cam follower 76 is connected to the mandril 78. The mandril 78 is provided with a opposing grooves 84 and 86 in which the first and second set of guide rollers 80, 82, respectively, are disposed. The first and second set of guide rollers 80 and 82, are securely and rigidly mounted to the support block 74.

In operation, the support assemblies 28 are continuously moved about the travel path of the first conveyor 22. While the support assemblies 28 are being moved, the cam follower 76 engages the cam 54. The cam follower 76 follows the surface of the cam 54 and thereby imparts a lifting motion to the mandril 78, which imparts a lifting motion to the support rod 70 and the supporting structure 72. The supporting structure 72 and thus, the flower pot covers 12 disposed thereon, are lifted through the lower open end 40 of the chutes 30 until the cam follower 76 is positioned at an apex of the cam 54. The supporting structure 72 is illustrated as having a inverted flower pot configuration and is sized to substantially correspond to the retaining space 18 if the flower pot cover 12.

As the cam follower 76 moves past the apex of the cam 54 gravity imparts a falling motion to the mandril 78 such that the support structure 72 is moved out of the object receiving space 42 of the chutes 30. The upward and downward motion of the mandril 78 is guided by the first and second sets of guide rollers 80 and 82, so that the mandril 78 is maintained in a stable position relative to the support block 74. The support block 74 can be provided with a groove 88 formed therein for permitting the support block 74 to ride on a guide 90. The guide 90 provides additional stability to the support block 74. The groove 88 also permits the support block 74 to be positioned in very close proximity to the first conveyor 22 such that the mechanical linkage between the first conveyor 22 and the support block 74 is enhanced.

Referring again to FIG. 1, the apparatus 10 can also be provided with a programmable logic controller 92 (PLC) for monitoring aspects of the apparatus 10 such as the speed of the first and second conveyors 22 and 24, information to be printed on the labels, such as bar codes, product identification codes, and instructions for use can also be stored in the PLC 90 and in this regard, such information can be provided to the labeling device 24 by the PLC 90. In addition, a counter can be connected to the apparatus 10 for detecting the number of flower pot covers 12 labeled during operation of the apparatus 10 and thus the number of labeled flower pot covers 12 disposed within the object receiving space 42 of the chutes 30. Alternately, the PLC 90 can be loaded with software to maintain a count of the flower pot covers 12 which are labeled. The count can be reset as desired, for example, when a stack of flower pot covers 12 are removed from the object receiving space 42 of the chutes 30. The software employed to maintain the count of flower pot covers 12 labeled can receive input from at least one of the object sensors 44, the object support sensor 46 or the labeling device 48.

The operation of the apparatus 10 for the automatic labeling and stacking of flower pot covers permits one or more individuals, such as individual 94 (FIG. 3) to position flower pot covers 12 in an inverted position on the support assemblies 28 during operation of the apparatus 10. The speed of the first conveyor 22 and the second conveyor 24, which are synchronized, can vary depending on the desired rate of operation. It has been determined that one individual 94 can position about forty flower pot covers 12 on the support assemblies 28 per minute, while two individuals can position about 54 flower pot covers 12 on the support assemblies 28 per minute.

It should be understood that while the operation of the apparatus 10 has been described for labeling flower pot covers 12, the apparatus 10 can be employed for labeling any objects having an outer surface, an open upper end and a retaining space wherein the object can be positioned on the support assemblies 28 and moved along the conveyor path of the first conveyor 22 so as to be labeled prior to engaging the chutes 30 of the second conveyor 24 for stacking or nesting therein.

Although the invention has been described in connection with a preferred embodiment, it will be understood that it is not intended to limit the invention to that embodiment. On the contrary, it is intended to cover all alternatives, modifications and equivalents as may be included within the spirit and scope of the invention as defined in the appended claims.

What is claimed is:

1. A method for labeling and stacking a plurality of flower pot covers, each of the flower pot covers having an outer surface, an open upper end and a retaining space openly communicating with the open upper end, the method comprising the steps of:
   (a) providing a first conveyor having a plurality of spatially disposed support assemblies connected thereto, each of the support assemblies selectively movable between a retracted position and an extended position, a portion of each of the support assemblies configured to substantially correspond to the configuration of the retaining space of the flower pot cover;
   (b) positioning a flower pot cover on each of the plurality of support assemblies such that the flower pot cover is disposed in an inverted position and the portion of the support assembly corresponding to the configuration of the retaining space of the flower pot cover is disposed within the retaining space of the flower pot cover;
   (c) moving the first conveyor along a first travel path whereby each of the support assemblies is sequentially moved through a first detection station for determining the presence of a flower pot cover on the support assembly and a second detection station for determining the location of the support assembly having the flower pot cover thereon;
   (d) automatically applying a label to the outer surface of each flower pot cover;
   (e) providing a second conveyor having a plurality of spatially disposed chutes supported thereon, each of the chutes having an object receiving space formed therein adapted to receive a plurality of flower pot covers, at least a portion of the second conveyor spatially disposed above the first conveyor;
   (f) moving the second conveyor along a second travel path whereby at least a portion of the second travel path of the second conveyor overlaps the first travel path of the first conveyor so that the support assemblies on the first conveyor are aligned with the chutes on the second conveyor, the movement of the first and second conveyors along their respective first and second travel paths being synchronized such that each of the plurality of support members having a flower pot cover supported thereon is selectively aligned with the object receiving space of one of the plurality of chutes supported by the second conveyor;
   (g) selectively moving the support member having the flower pot cover supported thereon to the extended position when same is aligned with the object receiving space of one of the chutes whereby the flower pot cover is inserted into the object receiving space of the chute;
   (h) moving the support member from the extended position to the retracted position whereby the flower pot cover is disengaged from the support assembly and supported within the object receiving space of the chute; and
   (i) repeating steps b–h to provide a nested stack of flower pot covers in the object receiving space of each chute.

2. The method for labeling and stacking a plurality of flower pot covers of claim 1 further including the step of:
   (j) removing the nested stack of flower pot covers from the object receiving space of each chute.

3. The method for labeling and stacking a plurality of flower pot covers of claim 2 wherein in step g, the support member is automatically moved between the extended position and the retracted position.

4. An apparatus for labeling and stacking flower pot covers, each of the flower pot covers having an outer surface, an open upper end and a retaining space, the apparatus comprising:
   a frame;
   a first conveyor supported by the frame;
   a plurality of spatially disposed support assemblies connected to the first conveyor, each of the support assemblies selectively movable between a retracted position and an extended position, a portion of each of the support assemblies disposable within the retaining space of a flower pot cover when the flower pot cover is in and inverted position;
   a second conveyor supported by the frame such that the second conveyor is disposed a distance above the first conveyor and a portion of the second conveyor overlays a portion of the first conveyor;
   a plurality of chutes connected to the second conveyor, each of the chutes having an open lower end and an object receiving space, each of the plurality of chutes alignable with one of the support assemblies upon movement of the first and second conveyors along their respective travel paths;
   motor means operably connected to the first and second conveyors for providing synchronized movement of the first and second conveyors;
   a labeler assembly disposed near the first conveyor upstream of the position where the second conveyor overlays a portion of the first conveyor;
   sensor means for detecting the presence of a flower pot cover on the support assembly approaching the labeler assembly, and upon detecting the presence of the flower pot cover, for activating the labeler assembly such that a label is automatically applied to the outer surface of the flower pot cover; and
   cam means for selectively moving each of the support assemblies to the extended position when each of the support assemblies approach and one of the chutes on the second conveyor is aligned with the open lower end of the chute whereby the support assembly moves the flower pot cover through the open lower end of the chute and into the object receiving space of the chute such that upon movement of the support assembly from the extended position to the retracted position the flower pot cover remains in the object receiving space of the chute.

5. The apparatus of claim 4 further comprising:
   a plurality of gripping members disposed within the object receiving space of each of the chutes for retaining flower pot covers therein.

6. The apparatus of claim 5 wherein the gripping members are elongated brushes having a plurality of bristles, and wherein the brushes are adjustably connect to the chute so that the size of the object receiving space can be varied to accommodate different sizes of flower pot covers.

7. The apparatus of claim 4 wherein the sensor means comprises:
- an object sensor for detecting the presence of the flower pot cover on the support assembly; and
- an object support sensor for detecting the approach of a support assembly, the object sensor, the object support sensor and the labeler assembly being operably connected whereby upon the object sensor detecting the presence of the flower pot cover on the support assembly, the object sensor enables the object support sensor which provides a signal to the labeler assembly to activate the labeler assembly when the enabled object support sensor detects the approaching support assembly having the flower pot thereon.

8. The apparatus of claim 7 wherein the object sensor and the object support sensor are electric eyes.

9. The apparatus of claim 4 wherein each of the plurality of support assemblies comprises:
- a cam follower assembly comprising:
  - a support block connected to the first conveyor;
  - a mandril slidably connected to the support block so as to provide upward and downward motion to the mandril; and
  - a cam follower connected to the mandril for imparting upward and downward motion to the mandril as the cam follower engages and moves along the cam.

10. The apparatus of claim 9 wherein the cam is provided with a substantially inverted V configuration.

* * * * *